United States Patent
Duprez et al.

(10) Patent No.: US 8,861,726 B2
(45) Date of Patent: Oct. 14, 2014

(54) METHOD FOR GENERATING CRYPTOGRAPHIC HALF-KEYS, AND ASSOCIATED SYSTEM

(75) Inventors: Adrien Duprez, Paris (FR); Paul Gompel, Boulogne-Billancourt (FR); Philippe Painchault, Colombes (FR)

(73) Assignee: Thales, Neuilly sur Seine (FR)

( * ) Notice: Subject to any disclaimer, the term of this patent is extended or adjusted under 35 U.S.C. 154(b) by 0 days.

(21) Appl. No.: 13/388,992

(22) PCT Filed: Aug. 4, 2010

(86) PCT No.: PCT/EP2010/061350
§ 371 (c)(1),
(2), (4) Date: Jul. 17, 2012

(87) PCT Pub. No.: WO2011/015600
PCT Pub. Date: Feb. 10, 2011

(65) Prior Publication Data
US 2013/0064366 A1 Mar. 14, 2013

(30) Foreign Application Priority Data
Apr. 8, 2009 (FR) .................... 09 03845

(51) Int. Cl.
*H04L 9/00* (2006.01)
*H04L 9/08* (2006.01)

(52) U.S. Cl.
CPC ............ *H04L 9/0833* (2013.01); *H04L 9/0838* (2013.01); *H04L 9/085* (2013.01); *H04L 9/0819* (2013.01); *H04L 9/0816* (2013.01)

USPC .............. 380/45; 380/277; 380/278; 380/283

(58) Field of Classification Search
CPC ....................................................... H04L 9/085
USPC ............................................................ 380/44
See application file for complete search history.

(56) References Cited

U.S. PATENT DOCUMENTS

| 6,584,566 B1 | 6/2003 | Hardjono |
| 2007/0248232 A1 | 10/2007 | Driscoll et al. |
| 2008/0226078 A1* | 9/2008 | Gabryjelski et al. .......... 380/277 |

FOREIGN PATENT DOCUMENTS

WO    WO 2007000761 A2 * 1/2007

OTHER PUBLICATIONS

Menezes, Vanstone, Oorschot, "Handbook of Applied Cryptography", 1997, pp. 524-527, CRC Press LLC, USA, XP002587353.

* cited by examiner

*Primary Examiner* — Alexander Lagor
(74) *Attorney, Agent, or Firm* — Baker & Hostetler LLP

(57) ABSTRACT

A method for generating cryptographic half-keys makes it possible to generate n pairs $(K^i_1, K^i_2)$, $1 \le i \le n$, of cryptographic half-keys, each of said pairs making it possible to reconstruct an access key $K_{PL}$ specific to a secure apparatus, said method comprising at least the following steps: generating and storing, with the help of a management center distinct from said apparatus, a first series of n half-keys $K^i_1$ on a recording medium; supplying the apparatus with said recording medium so as to generate, with the help of said local key $K_{PL}$ and of the n half-keys $K^i_1$ stored on said medium, a second series of n half-keys $K^i_2$ making it possible to form said n pairs $(K^i_1, K^i_2)$. The method applies notably to the creation of several keys for access to a secure apparatus.

10 Claims, 1 Drawing Sheet

METHOD FOR GENERATING CRYPTOGRAPHIC HALF-KEYS, AND ASSOCIATED SYSTEM

CROSS-REFERENCE TO RELATED APPLICATIONS

This application is a National Stage of International patent application PCT/EP2010/061350, filed on Aug. 4, 2010, which claims priority to foreign French patent application No. FR 0903845, filed on Aug. 4, 2009, the disclosures of which are incorporated by reference in their entirety.

FIELD OF THE INVENTION

The present invention relates to a method for generating cryptographic half-keys and its implementation system. It applies notably to the creation of several keys for access to a secure apparatus.

BACKGROUND

An apparatus designed for handling sensitive information may be made secure by encrypting this information with the aid of a cryptographic key composed of several distinct elements. Such a key is thus conventionally defined by a pair of half-keys stored separately from one another. For example, a first half-key is stored within the secure apparatus while a second half-key is recorded on a medium external to the apparatus. When this external medium is connected to the apparatus, the two half-keys are combined to form the access key for the apparatus and thus allow its use. An example of such a securing method is designated by the acronym CIK for "Crypto Ignition Key". The acronym CIK designates in a general manner the principle of use of a cryptographic key allowing the booting of a cryptographic apparatus. With a view to simplification, a recording medium external to the secure apparatus and able to store a CIK half-key will be designated by the expression "CIK plug". A CIK plug may be allocated to a particular user or to a group of users and thus, in addition to allowing the unlocking of the secure apparatus, make it possible to identify a user, and to identify his role (administrator, maintenance agent, operator, etc.).

Conventionally, the complete initialization of a CIK plug necessitates its connection to the apparatus, the creation of a pair of half-keys, one of which is stored solely on the apparatus and the other of which is transmitted and recorded on the CIK plug, and then a configuration phase, for example to configure the access rights in respect of the user for whom the CIK plug is intended. Hence, when several users need to use a secure apparatus, it becomes necessary to initialize several CIK plugs, for example one plug per user, sometimes with different configurations from one CIK plug to another. The initialization of a series of CIK plugs therefore requires the execution of multiple cycles of connection/configuration/disconnection which render the manipulations lengthy and repetitive, and consequently also sources of errors, more particularly when the apparatus has no ergonomic means for transmitting instructions to it, for example no man-machine interface, no screen, no keyboard and no mouse. Moreover, the apparatus may be placed in a cramped space, for example on board a vehicle or an aircraft, thus making it difficult to access the connectors of the apparatus that are designed to receive the plugs, yet further complicating the task of the operator responsible for initialization, and immobilizing the vehicle for a certain period.

A first solution for simplifying the initialization of these media consists in installing on the apparatus to be secured a graphical interface and means of interaction with a user such as, for example, a keyboard. However, the apparatuses to be secured do not always lend themselves to the setting up of a graphical interface or to the connecting of user input/output means. For example, an onboard facility for encrypted radiocommunications is not designed to accommodate such upgrades. Moreover, a keyboard may not be usable within certain contexts of employment (notably with the use of gloves or mittens). Likewise, for example, a back-lit screen cannot be employed at night when it is desired to maintain a certain discreetness of use.

A second solution for simplifying the procedure for initializing the CIK plugs is to use a generic key-setup system. However, this type of system is very complex to implement, therefore very expensive.

SUMMARY OF THE INVENTION

An aim of the invention is to propose an inexpensive scheme making it possible to initialize CIK plugs readily, in particular when the latter are employed on apparatuses having no ergonomic man-machine interface. For this purpose, the subject of the invention is a method for generating n pairs $(K^i_1, K^i_2)$, $1 \leq i \leq n$, of cryptographic half-keys, each of said pairs making it possible to reconstruct an access key $K_{PL}$ specific to a secure apparatus, said method being characterized in that it comprises at least the following steps:
  generating and storing, with the help of a management center distinct from said apparatus, a first series of n half-keys on a recording medium;
  supplying the apparatus with said recording medium so as to generate, with the help of said access key $K_{PL}$ and of the n half-keys stored on said medium, a second series of n half-keys $K^i_2$ making it possible to form said n pairs $(K^i_1, K^i_2)$.

The apparatus can thus be initialized by n pairs of different half-keys. Indeed, the association of the half-keys belonging to each of the n pairs $(K^i_1, K^i_2)$ formed with the two series of half-keys makes it possible to reconstruct the local key $K_{PL}$.

According to an implementation of the method for generating pairs of cryptographic half-keys according to the invention, a file of commands is produced by the management center, said file of commands being stored on the recording medium, said file containing instructions to be read by the apparatus so as to command the generation by the secure apparatus of the second series of half-keys $K^i_2$. Such a recording medium is more commonly designated by the term "Fill Gun".

According to an implementation of the method for generating pairs of cryptographic half-keys according to the invention, the apparatus does not have any ergonomic input means to allow a user to transmit instructions. For example, there may be no keyboard or mouse installed on said apparatus.

The management center may be a personal computer linked to a bank of connectors adapted for the connection of a medium storing a half-key $K^i_1$, said computer being provided with software for generating half-keys.

According to an implementation of the method according to the invention, each of the media storing one or more half-keys $K^i_1$ is allocated to a user or a group of users of the secure apparatus, the method comprising a step of defining access rights in respect of each of said media, via a graphical interface installed on the management center.

Each of the n half-keys $K^i_1$ of the first series may be stored on a removable medium external to the apparatus, the n half-keys $K^i_2$ of the second series being recorded on the apparatus. The removable medium containing a half-key may be associated with a user, so that each user entitled to access the secure apparatus possesses his own access half-key.

The apparatus may be a system for encrypted radiocommunications, an apparatus endowed with cryptographic means or more generally any system necessitating the protection of certain sensitive data.

The subject of the invention is also a system for generating n pairs ($K^i_1$, $K^i_2$), 1≤i≤n, of cryptographic half-keys, each of said pairs making it possible to reconstruct an access key $K_{PL}$ specific to a secure apparatus, the system comprising a management center provided with a bank of connectors able to receive removable media adapted for the recording of one or more half-keys $K^i_1$, the system comprising a recording medium to be connected up to the secure apparatus and adapted for the implementation of the method such as described above.

In contradistinction to a conventional initialization method in the course of which the two half-keys of a pair ($K^i_1$, $K^i_2$) are created at the same time with the help of the secure apparatus, the method according to the invention dissociates the creation of these two half-keys $K^i_1$, $K^i_2$, which are nevertheless tightly related mathematically.

BRIEF DESCRIPTION OF THE DRAWINGS

Other characteristics will become apparent on reading the following nonlimiting detailed description given by way of example in regard to appended drawings which represent.

DETAILED DESCRIPTION

Figure 1:
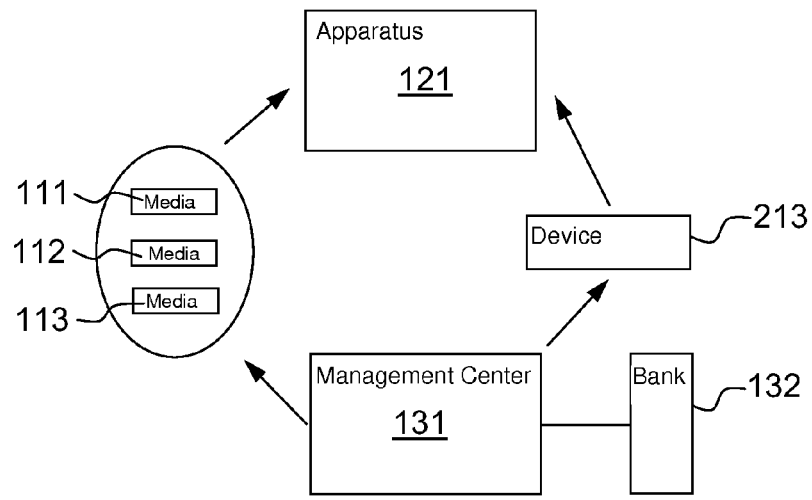
FIG. 1, elements implemented during the execution of a method according to the invention, FIG. 2, a schematic illustrating the steps of a method according to the invention.

FIG. 1 presents elements implemented during the execution of a method according to the invention. The method applies to the initialization of media 111, 112, 113, in the example CIK plugs, able to connect up to a secure apparatus 121 to allow its unlocking. To perform this initialization, a device 213 for injecting files into the apparatus 121 and a management center 131 are used. As explained further on, the management center 131 is linked to a bank 132 of connectors able to receive the media 111, 112, 113.

Figure 2:
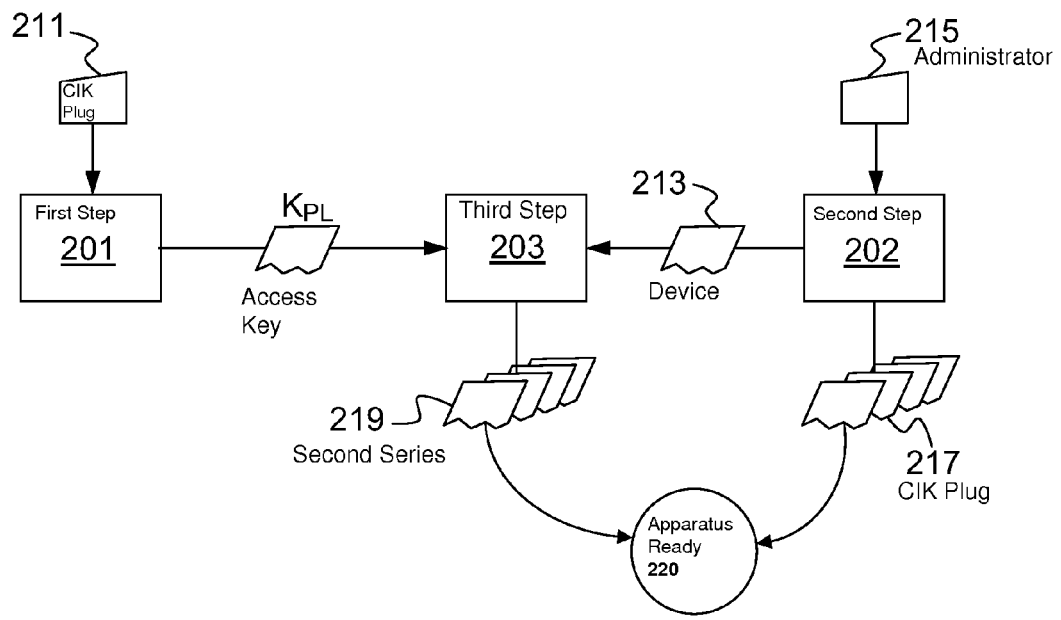

FIG. 2 presents a schematic illustrating the steps of a method according to the invention. The example developed in the figure relates to the creation of n pairs of half-keys allowing, for example, n different users to access a secure apparatus.

During a first step 201, a CIK plug 211 with administrator rights is connected to a secure apparatus. This secure apparatus is for example a high-security radiocommunications terminal, an IP encrypter, a file encryption system. The apparatus is unusable as long as a cryptographic access key $K_{PL}$ has not been reconstructed. It should be noted that in order to execute the method according to the invention, it is therefore necessary that an already initialized CIK plug be previously available. Stated otherwise, it was necessary firstly to perform a conventional initialization of a CIK plug—that of the administrator, in the example—so as to be able to initialize the other CIK plugs afterwards.

Connecting the CIK plug 211 to the apparatus therefore makes it possible to reconstruct the cryptographic access key $K_{PL}$ for this apparatus, by combining the half-key present on the CIK 211 and the associated half-key present on the apparatus. The apparatus therefore remains usable as long as the CIK plug 211 remains connected to the apparatus. This connection may be carried out by physically joining the plug up with the apparatus or by any other means.

During a second step 202, a qualified person, for example an administrator, utilizes a management center to create n half-keys, each intended for a different CIK plug, the CIK plugs being able to unlock the same apparatus or different apparatuses. The management center is, for example, a personal computer, advantageously placed in an ergonomic and secure environment, furnished with a graphical interface allowing the administrator to create a new user number for someone entitled to possess a CIK plug for accessing the apparatus, said graphical interface also making it possible, for example, to allocate more or less extensive rights to future users of the CIK plugs. The personal computer is linked to connection means for CIK plugs, for example, a bank comprising ten or so connectors.

Firstly, n virgin CIK plugs to be initialized are therefore connected to a bank, which is linked to a personal computer. Furthermore, a device 213 for injecting files into the apparatus is also connected to the computer, this type of device sometimes being designated by the term "Fill Gun". For example, the device 213 is linked to the computer and to the apparatus by standard interfaces, of RS232, RS485, USB type. Thereafter, the administrator 215 creates, for example via a man-machine interface executed by the computer, a number n of plugs to be considered and a number p of secure apparatuses to which access is required. The computer then creates n half-keys $K^i_1$, 1≤i≤n, one for each CIK plug to be initialized. Each of these half-keys $K^i_1$ is transmitted to a CIK plug 217 connected to the bank and the n half-keys $K^i_1$ are transmitted to the file injection device 213. The administrator 215 can also allocate different access rights in respect of each CIK plug. Finally, a file of commands is created on the injection device 213, this file containing instructions comprehensible to the secure apparatus in order to complete the initialization, as explained further on, during a third step 203 of the method.

On termination of the second step 202, each CIK plug 217 records an identifier of the apparatus to which it allows access and its half-key $K^i_1$, and the file injection device 213 contains a file of commands and, for each association between a CIK plug and the apparatus to which it allows access, the half-key $K^i_1$ of the CIK plug and the access rights associated with this CIK plug.

One and the same CIK plug may be used for several different apparatuses; in this case, several different half-keys are recorded on one and the same CIK plug.

Moreover, the first step 201 and the second step 202 may be inverted, without prejudice to the result obtained by the method according to the invention.

During a third step 203, the file injection device 213 is connected to the secure apparatus. The file of commands generated during the second step 202 is read by the apparatus and the latter, with the help of the cryptographic access key $K_{PL}$ and of the n half-keys $K^i_1$ contained in the file injection device 213, produces a second series 219 of n half-keys $K^i_2$ to be stored on the secure apparatus. To each half-key $K^i_1$ of the first series 217 there corresponds a half-key $K^i_2$ of the second series 219. Stated otherwise, n pairs of half-keys ($K^i_1$, $K^i_2$) are formed, each of these pairs making it possible to reconstruct the cryptographic access key $K_{PL}$ for the apparatus, the half-keys of each pair being stored on distinct media (apparatus and CIK plug). Preferably, once a half-key $K^i_2$ of the second series 219 has been created, the corresponding half-key $K^i_1$ in the first series 217 is erased from the file injection device 213.

Moreover, the user numbers present on the file injection device 213 as well as the rights associated with these users are also transmitted to the apparatus. The apparatus thereafter interprets what these levels of right represent.

On termination of this third step 203, the secure apparatus is ready 220 to be used via any of the initialized CIK plugs. When a user connects his CIK plug to the locked apparatus, the apparatus reconstructs the cryptographic access key $K_{PL}$ and grants the privileges initially configured for this user.

Except for the prior connection indispensable to the initialization of an administrator CIK plug 211, a single connection to the apparatus has therefore been necessary (that of the file injection device 213), when the prior art required n connections of CIK plugs to an apparatus to generate n half-keys. Thus, when n≥2, lengthy and repetitive manipulations are avoided, thereby decreasing the risk of error in the generation of the half-keys.

When a CIK plug is lost, it must be possible to deactivate it within the apparatus, which, conventionally, makes it necessary to tell the apparatus which CIK plug is lost, and therefore to have plug identifiers. Now, in order that the apparatus can know these identifiers, it must be possible to enter them and therefore the apparatus must have for example a keyboard.

The method according to the invention allows the use of a file of commands which is subsequently injected into the apparatus so as to order it to delete all the CIK plugs, or to delete all the plugs except the one which is connected. Thus, no need for CIK plug identifier or keyboard.

The method according to the invention exhibits notably the advantage of reducing threats related to erroneous initialization of the apparatus, while preserving a high level of security.

Another advantage of the method according to the invention is that it is upgradeable, since the procedure put in place at the management center level may be refined, on account of the possibilities of adaptation.

The invention claimed is:

1. A method for generating cryptographic half-keys, comprising:
generating n pairs ($K^i_1$, $K^i_2$), 1≤i≤n, of cryptographic half-keys operative to allow n different users to access a secure apparatus, each of said pairs operative to reconstruct an access key $K_{PL}$ specific to the secure apparatus;
generating a first series of said n half-keys $K^i_1$;
storing, with the help of a management center distinct from said secure apparatus, said first series of said n half-keys $K^i_1$ on a plurality of non-transitory recording mediums, wherein the management center is a computer linked to a bank of connectors operative to the connection of a non-transitory medium storing a half-key $K^i_1$ said computer being provided with software for generating half-keys;
wherein each medium of said plurality of recording mediums stores one or more half-keys $K^i_1$ being allocated to a group of said users of the secure apparatus, further comprising a step of defining access rights in respect of each of said mediums, via a graphical interface installed on the management center;
recording an identifier of the secure device to which the management center allows access and a half-key $K^i_1$ associated with the secure device;
connecting a file injection device to the secure apparatus, said file injection device receiving a transmission from the recording medium with the first series of said n half-keys $K^i_1$;
producing a second series of n half-keys $K^i_2$ based upon the access key $K_{PL}$ and based upon the first series of said n half-keys $K^i_1$ contained in the file injection device, for storage on the secure apparatus; and
reconstructing the access key $K_{PL}$ specific to the secure apparatus when a user connects to the secure apparatus, wherein a file of commands is produced by the management center, said file of commands being stored on the recording medium, said file containing instructions to be read by the secure apparatus to command a generation of the second series of half-keys $K^i_2$ by the secure apparatus.

2. The method for generating cryptographic half-keys as claimed in claim 1, wherein the apparatus does not have any ergonomic input means to allow the user to transmit instructions.

3. The method for generating cryptographic half-keys as claimed in claim 1, wherein computer is a personal computer.

4. The method for generating cryptographic half-keys as claimed in claim 1, wherein each of the n half-keys $K^i_1$ of the first series is stored on a non-transitory removable medium external to the apparatus, the n half-keys $K^i_2$ of the second series being recorded on the apparatus.

5. The method for generating cryptographic half-keys as claimed in claim 1, wherein the apparatus comprises cryptographic means.

6. A system for generating n pairs ($K^i_1$, $K^i_2$), 1≤i≤n, of cryptographic half-keys, each of said pairs used to reconstruct an access key $K_{PL}$ specific to a secure apparatus, the system comprising:
a management center, being a computer, provided with a bank of connectors operative to receive non-transitory removable media operative for the recording of one or more half-keys $K^i_1$, said personal computer being provided with software for generating half-keys; and
a non-transitory recording medium to be connected up to the secure apparatus, the system operative to:
generate n pairs ($K^i_1$, $K^i_2$), 1≤i≤n, of cryptographic half-keys operative to allow n different users to access secure apparatus, each of said pairs operative to reconstruct an access key $K_{PL}$ specific to the secure apparatus;
generate and store, with the help of a management center distinct from said secure apparatus, a first series of said n half-keys $K^i_1$ on a plurality of non-transitory recording mediums,
wherein each non-transitory medium of said plurality of recording mediums stores one or more half-keys $K^i_1$ being allocated to a group of said users of the secure apparatus, further comprising a step of defining access rights in respect of each of said mediums, via a graphical interface installed on the management center;
record an identifier of the secure device to which the management center allows access and a corresponding half-key $K^i_1$;
connect a file injection device to the secure apparatus, said file injection device receiving a transmission from the recording medium with the n half-keys $K^i_1$;
produce a second series of n half-keys $K^i_2$ based upon the access key $K_{PL}$ and based upon the n half-keys $K^i_1$ contained in the file injection device, for storage on the secure apparatus; and
reconstruct the access key $K_{PL}$ specific to the secure apparatus when a user connects to the secure apparatus,
wherein a file of commands is produced by the management center, said file of commands being stored on the recording medium, said file containing instructions to be read by the secure apparatus to command a generation of the second series of half-keys $K^i_2$ by the secure apparatus.

7. The system of claim 6, wherein the secure apparatus does not have any ergonomic input means to allow the user to transmit instructions.

8. The system of claim 6, wherein said computer is a personal computer.

9. The system of claim 6, wherein each of the n half-keys $K^i_1$ of the first series is stored on a non-transitory removable medium external to the secure apparatus, the n half-keys $K^i_2$ of the second series being recorded on the secure apparatus.

10. The system of claim 6, wherein the secure apparatus comprises cryptographic means.

* * * * *